US006826585B2

(12) United States Patent
Mitsunaga et al.

(10) Patent No.: US 6,826,585 B2
(45) Date of Patent: Nov. 30, 2004

(54) METHOD AND APPARATUS FOR SOLVING SIMULTANEOUS LINEAR EQUATIONS

(75) Inventors: Saori Mitsunaga, Tokyo (JP); Shinichi Tanaka, Tokyo (JP); Hiroki Kawamura, Yokohama (JP)

(73) Assignee: Hitachi Software Engineering Co., Ltd., Yokohama (JP)

( * ) Notice: Subject to any disclaimer, the term of this patent is extended or adjusted under 35 U.S.C. 154(b) by 392 days.

(21) Appl. No.: 10/057,095

(22) Filed: Oct. 19, 2001

(65) Prior Publication Data

US 2002/0077789 A1 Jun. 20, 2002

(30) Foreign Application Priority Data

Nov. 16, 2000 (JP) ........................................ 2000-349075

(51) Int. Cl.⁷ .............................. G06F 7/38; G06F 7/32
(52) U.S. Cl. ...................................... 708/446; 708/520
(58) Field of Search .................................. 708/446, 520

(56) References Cited

U.S. PATENT DOCUMENTS

| | | | | |
|---|---|---|---|---|
| 5,301,342 A | * | 4/1994 | Scott | 708/446 |
| 5,392,429 A | * | 2/1995 | Agrawal et al. | 708/446 |
| 5,490,278 A | * | 2/1996 | Mochizuki | 708/446 |
| 5,604,911 A | * | 2/1997 | Ushiro | 703/2 |
| 5,717,621 A | * | 2/1998 | Gupta et al. | 708/446 |
| 5,887,186 A | * | 3/1999 | Nakanishi | 712/28 |
| 5,905,666 A | * | 5/1999 | Hoffman et al. | 708/520 |
| 6,694,343 B2 | * | 2/2004 | Forrest et al. | 708/520 |

OTHER PUBLICATIONS

Gene H. Golub and Charles F. Van Loan, *Matrix Computations*, 3d ed., Johns Hopkins University Press (1996), pp. 94–104.

Tutomu Oguni, *Matrix Computation Software—WS, Super Computer and Parallel Computer*, Maruzen Co., Ltd. (1991), pp. 229–231. [No English translation available.]

* cited by examiner

*Primary Examiner*—Tan V. Mai
(74) *Attorney, Agent, or Firm*—Townsend and Townsend and Crew LLP (57) ABSTRACT

In a simultaneous-linear-equations solving method of calculating the numerical solutions of simultaneous linear equations having a coefficient matrix, all the elements of coefficient matrix elements including zero elements and all the elements of right-side vector elements are stored into an array. Next, a non-zero-structure-specifying index table is created which indicates the row number of a terminal-end non-zero element in each column and the column number of a terminal-end non-zero element in each row within the array. Moreover, a decomposition processing is executed toward the elements existing within a range indicated by the created index table. Finally, a forward/backward substitution processing is executed toward the coefficient matrix elements subjected to the decomposition processing and the right-side vector elements stored into the array, thereby determining the numerical solutions.

12 Claims, 6 Drawing Sheets

METHOD AND APPARATUS FOR SOLVING SIMULTANEOUS LINEAR EQUATIONS

BACKGROUND OF THE INVENTION

The present invention relates to simultaneous-linear-equations solving method and apparatus for calculating numerical solutions of simultaneous linear equations. In particular, it relates to a technology that is effective when applied to a simultaneous-linear-equations solving apparatus for calculating the numerical solutions in a manner of being independent of the type (i.e., the non-zero structure) of the coefficient matrix of the simultaneous linear equations.

From conventionally, as the solving methods of solving the simultaneous linear equations the coefficient matrix of which is a dense matrix, there have existed many methods such as the Gauss method and the Crout transformation method. These methods are described in, for example, Gene H. Golub and Charles F. Van Loan, "Matrix Computations", published by Johns Hopkins University Press, 3rd edition, 1996, pp. 94–104. In the case where the coefficient matrix has been already found to be a sparse matrix, starting with the Skyline method, there exist many solving methods as data storing methods where attention is focused on the structure of the non-zero elements of the coefficient matrix and as the solving methods of solving the simultaneous linear equations the coefficient matrix of which is the sparse matrix and which are suitable for the above-described data storing methods. The methods of solving the simultaneous linear equations the coefficient matrix of which is the sparse matrix are disclosed in, for example, "Matrix Computation Software-WS, Super Computer, and Parallel Computer", edited/written by Tutomu Oguni, Maruzen Co., Ltd., pp. 229–231. In order to reduce the resource amount and the wasteful calculation of the zero elements needed for the data storage, it is important to select a most-suitable optimum solving method in correspondence with the structure of the non-zero elements of the coefficient matrix. This selection of the solving method necessitates the empirical and professional knowledge.

In the conventional numerical solving methods for the simultaneous linear equations, in the case of solving the simultaneous linear equations the coefficient matrix of which is the sparse matrix, the selection of the optimum solving method has necessitated the empirical and professional knowledge. As a result, a user who has no empirical and professional knowledge has found it difficult to solve the simultaneous linear equations the coefficient matrix of which is the sparse matrix.

SUMMARY OF THE INVENTION

Also, in the conventional numerical solving methods for the simultaneous linear equations, in the case where the coefficient matrix of the simultaneous linear equations to be solved is the sparse matrix, the use of the dense matrix-suitable solving methods has caused so much waste to be produced. This is especially apparent when compared with the case of using the sparse matrix-suitable solving methods in both the resource amount and the calculation amount needed for the data storage. In recent years, in a mass-storage-memory mounting apparatus the representative of which is a distributed-memory-type parallel computer or the like, the above-described waste of storing the zero elements has been becoming a less serious problem. However, there still remains the problem of the increase in the calculation amount, which occurs in the case where the dense matrix-suitable solving methods are used for solving the simultaneous linear equations the coefficient matrix of which is the sparse matrix.

It is an object of the present invention to provide a technology that makes the following possible: To solve the above-described problem, to implement an enhancement in the operability of an information processing apparatus for calculating numerical solutions of simultaneous linear equations, and to reduce the calculation amount needed for determining the solutions.

In the present invention, in the simultaneous-linear-equations solving apparatus for calculating the numerical solutions of the simultaneous linear equations the coefficient matrix of which is the sparse matrix, too, all the elements of the sparse matrix including the zero elements are stored into an array in much the same way as the case of the dense matrix. After that, a decomposition processing and a forward/backward substitution processing are executed concerning within the range of the non-zero elements thereof, thereby determining the solutions.

In the present invention, all the elements of the coefficient matrix elements of the sparse matrix including the zero elements, and all the elements of the right-side vector elements are stored into an array in much the same way as the case of the dense matrix.

Next, the values stored into the above-described array are examined, thereby creating a non-zero-structure-specifying index table for indicating the row number of a terminal-end non-zero element in each column and the column number of a terminal-end non-zero element in each row within the above-described array.

Moreover, of the coefficient matrix elements within the above-described array, the decomposition processing is executed concerning within the range of the non-zero elements indicated by the above-described created non-zero-structure-specifying index table. In addition, the forward/backward substitution processing is executed toward the coefficient matrix elements subjected to the above-described decomposition processing and the right-side vector elements stored into the above-described array, thereby determining the solutions.

As described earlier, according to the present invention, the waste of storing the zero elements is tolerated, and the same data storing methods as those for the dense matrix are employed for whatever coefficient matrix in a manner of being independent of the structure of the non-zero elements of the coefficient matrix, thereby implementing the enhancement in the operability. Namely, there is no necessity to store, into the memory, programs for causing the computer to execute the various types of solving methods for solving the simultaneous linear equations the coefficient matrix of which is the sparse matrix. Also, there is no necessity for a user to select one solving method from among the various types of solving methods. Furthermore, the calculations are executed concerning only the elements existing within the range indicated by the above-described created non-zero-structure-specifying index table. This allows the simultaneous linear equations to be solved in such a manner that the calculation amount therefor has been reduced.

As described so far, according to the simultaneous-linear-equations solving apparatus of the present invention, all the elements of the sparse matrix including the zero elements are stored into the array in much the same way as the case of the dense matrix. After that, using the above-described index table, the decomposition processing and the forward/backward substitution processing are executed concerning within the range of the non-zero elements thereof, thereby determining the solutions. This method makes it possible to implement the enhancement in the operability of the information processing apparatus for calculating the numerical solutions of the simultaneous linear equations, and to reduce the calculation amount needed for determining the solutions.

DESCRIPTION OF THE EMBODIMENTS

Hereinafter, the explanation will be given below concerning an embodiment of the simultaneous-linear-equations solving apparatus for calculating the numerical solutions of the simultaneous linear equations the coefficient matrix of which is the sparse matrix.

Figure 1:
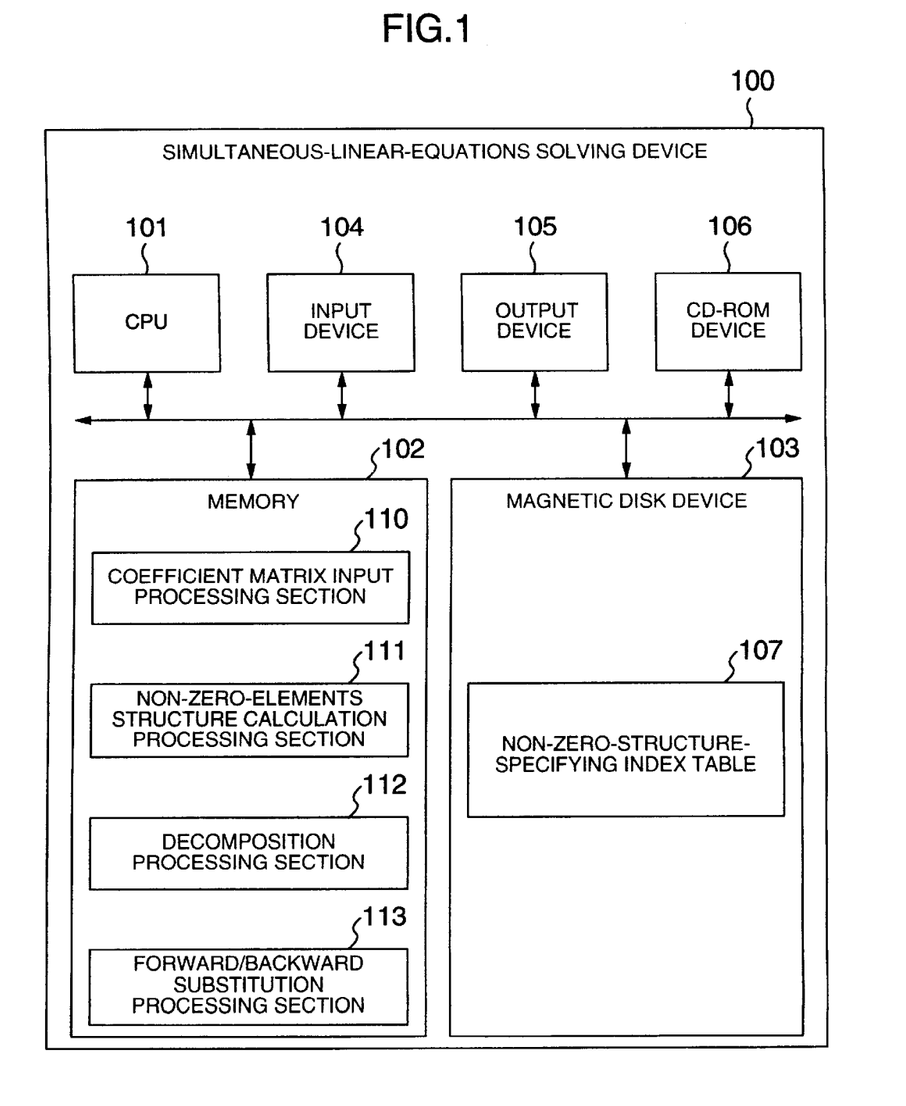
FIG. 1 is a diagram for illustrating the schematic configuration of a simultaneous-linear-equations solving apparatus in the present embodiment.

FIG. 1 is a diagram for illustrating the schematic configuration of a simultaneous-linear-equations solving apparatus 100 in the present embodiment. As illustrated in FIG. 1, the simultaneous-linear-equations solving apparatus 100 in the present embodiment includes a CPU 101, a memory 102, a magnetic disk device 103, an input device 104, an output device 105, a CD-ROM device 106, and a non-zero-structure-specifying index table 107.

The CPU 101 is an apparatus for controlling the operation of the simultaneous-linear-equations solving apparatus 100 as a whole. The memory 102 is a memory apparatus that, when controlling the operation of the simultaneous-linear-equations solving apparatus 100 as a whole, loads the various types of programs and data therefor.

The magnetic disk device 103 is a memory device for storing the above-described various types of programs and data. The input device 104 is a device for performing the various types of inputs for calculating the numerical solutions of the above-described sparse-matrix simultaneous linear equations. The output device 105 is a device for performing the various types of outputs accompanying the calculation of the numerical solutions of the sparse-matrix simultaneous linear equations.

The CD-ROM device 106 is a device for reading out the contents of a CD-ROM storing the above-described various types of programs. The non-zero-structure-specifying index table 107 is a table for storing, of the coefficient matrix elements within the array, the row number of a terminal-end non-zero element in a designated column and the column number of a terminal-end non-zero element in a designated row.

Also, the simultaneous-linear-equations solving apparatus 100 includes a coefficient matrix input processing section 110, a non-zero-elements structure calculation processing section 111, a decomposition processing section 112, and a forward/backward substitution processing section 113.

The coefficient matrix input processing section 110 is a processing section for storing all the elements of the coefficient matrix elements of the sparse matrix including the zero elements and all the elements of the right-side vector elements into the array independently of the structure of the non-zero elements thereof and in much the same way as the case of the dense matrix. The non-zero-elements structure calculation processing section 111 is a processing section for storing, into the non-zero-structure-specifying index table 107, the row number of a terminal-end non-zero element in each column and the column number of a terminal-end non-zero element in each row within the above-described array.

The decomposition processing section 112 is a processing section for executing the decomposition processing toward the elements within the range indicated by the above-described created non-zero-structure-specifying index table 107. Moreover, if a pivoting occurs by a partial pivoting based on a row exchange for enhancing the accuracy of the solutions, the decomposition processing section updates the contents of the non-zero-structure-specifying index table 107. The forward/backward substitution processing section 113 is a processing section for executing the forward/backward substitution processing toward the coefficient matrix elements subjected to the above-described decomposition processing and the right-side vector elements stored into the above-described array, and for, thereby, determining the solutions.

The programs for causing the simultaneous-linear-equations solving apparatus 100 to function as the coefficient matrix input processing section 110, the non-zero-elements structure calculation processing section 111, the decomposition processing section 112, and the forward/backward substitution processing section 113 are recorded into a recording medium such as the CD-ROM. These programs are loaded onto the memory directly or via the magnetic disk, then being executed by the CPU 101. Incidentally, the recording medium for recording the above-described programs may be another recording medium other than the CD-ROM.

The coefficient matrix input processing section 110 of the simultaneous-linear-equations solving apparatus 100 in the present embodiment executes the following: Inputting the values of the coefficient matrix elements A of the sparse matrix and the values of the right-side vector elements B which are presented by an expression Ax=B, storing all the elements of the coefficient matrix elements A of the sparse matrix including the zero elements into a 2-dimensional array A on the memory of the coefficient matrix input processing section 110 independently of the structure of the non-zero elements thereof and in much the same way as the case of the dense matrix, and storing the right-side vector elements into a 1-dimensional array B.

The non-zero-elements structure calculation processing section 111 of the simultaneous-linear-equations solving apparatus 100 executes the following: Making reference to the values of the coefficient matrix elements A stored into above-described array, and creating the non-zero-structure-specifying index table 107 for indicating, of the coefficient matrix elements A within the array, the row number of a terminal-end non-zero-element in a designated column and the column number of a terminal-end non-zero element in a designated row.

Figure 2:
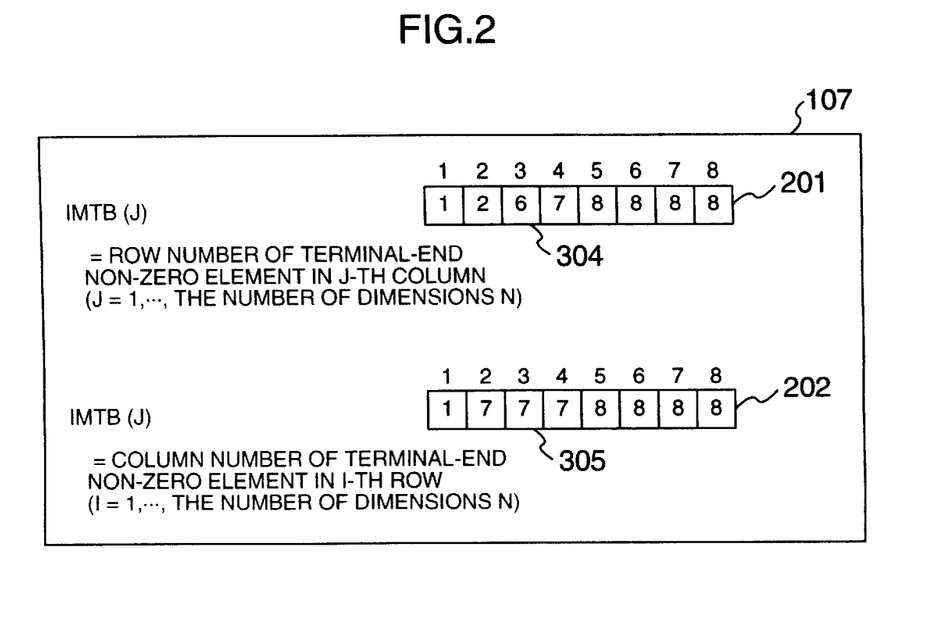
FIG. 2 is a diagram for illustrating one example of a non-zero-structure-specifying index table 107 in the present embodiment.

FIG. 2 illustrates one example of the non-zero-structure-specifying index table 107 created by the non-zero-elements structure calculation processing section 111.

An index IMTB 201 is an index for indicating the row number of a terminal-end non-zero element in the J-th column. An index JMTB 202 is an index for indicating the column number of a terminal-end non-zero element in the I-th row. Here, I, J each take on the values in the range of 1 to N, i.e., the number of dimensions of the coefficient matrix. The terminal-end non-zero element in the J-th column refers to a non-zero element the row number of which is the largest in the J-th column. Similarly, the terminal-end non-zero element in the I-th row refers to a non-zero element the column number of which is the largest in the I-th row. A table including the index IMTB 201 and the index JMTB 202 is defined as the non-zero-structure-specifying index table 107.

Figure 3:
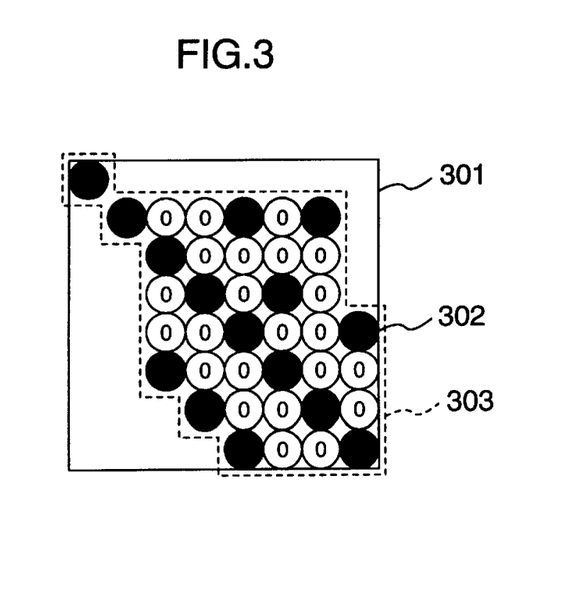
FIG. 3 is a diagram for illustrating one example of an index IMTB 201 and that of an index JMTB 202 in the present embodiment.

Employing, as an example, a sparse matrix 301 whose number of dimensions is 8 and which is illustrated in FIG. 3, the explanation will be given below concerning the configuration of the non-zero-structure-specifying index table 107.

Non-zero elements 302 denoted by a mark "●" in FIG. 3 indicate elements whose values are non-zero of the coefficient matrix elements of the sparse matrix 301. A calculation range 303 represented by a dashed line indicates the range of the elements surrounded by the values in the index IMTB 201 and the index JMTB 202. A mark "○" denotes zero elements within the calculation range 303.

An example 304 of the terminal-end non-zero element's row number in the index IMTB 201 illustrated in FIG. 2 indicates a numerical value example set in an index IMTB (3). Since, as seen from FIG. 3, the row number of the terminal-end non-zero element in the 3rd column is equal to "6", the index IMTB (3) is given by IMTB (3)=6. Similarly, an example 305 of the terminal-end non-zero element's column number in the index JMTB 202 illustrated in FIG. 2 indicates a numerical value example set in an index JMTB (4). In the example of the sparse matrix 301 in FIG. 3, the column number of the terminal-end non-zero element in the 4th row is equal to "6". In the present embodiment, however, the setting is performed so that the following relations will hold: IMTB (J)≧IMTB (J−1), JMTB (I)≧JMTB (I−1) (I, J=2, . . . , N) These relations are given in order that modifications in the indexes will be minimized even toward a variation in the non-zero structure caused by the pivoting. As a result, eventually, the index JMTB (4) is given by JMTB (4)=7.

Figure 4:
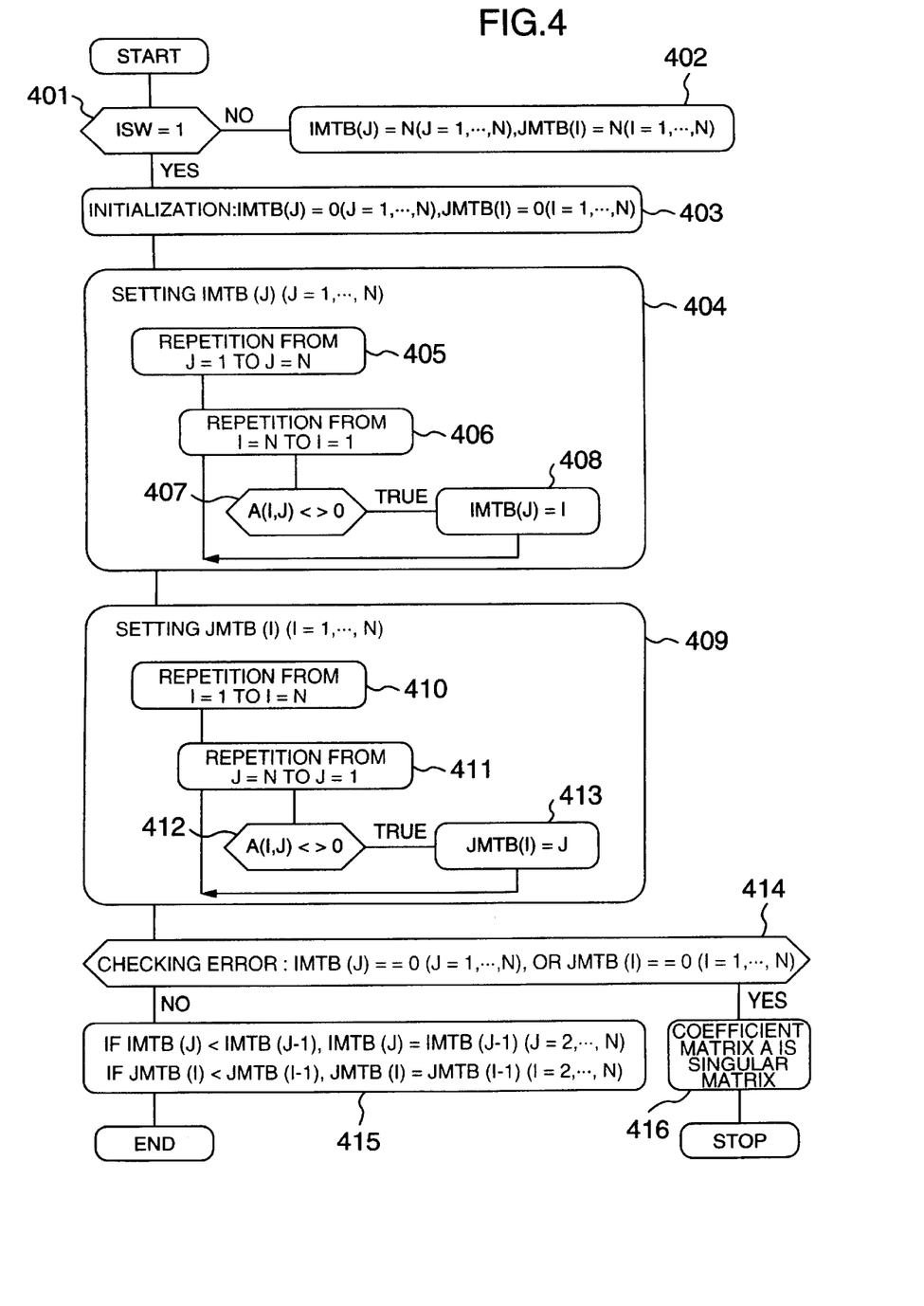
FIG. 4 is a flow chart for illustrating the processing steps of the non-zero-elements structure calculation processing in the present embodiment.

FIG. 4 is a flow chart for illustrating the processing steps of the non-zero-elements structure calculation processing in the present embodiment. At first, the non-zero-elements structure calculation processing section 111 inputs the value of a variable ISW capable of being designated from the outside and indicating whether or not to calculate the structure of the non-zero elements, and judges whether or not the value of ISW is equal to "1" (step 401). Here, if ISW is not equal to "1", it is assumed to indicate that all the elements of the coefficient matrix are non-zero and thus there is no necessity to calculate the structure of the non-zero elements. In the case where all the elements of the coefficient matrix have been found to be non-zero, the setting of this ISW makes it possible to omit steps 403 to 415.

As the result of judging the value of ISW at the step 401, if it is judged not to calculate the structure of the non-zero elements, i.e., ISW is not equal to "1", the processing goes to a step 402 and all the values in the indexes IMTB 201 and JMTB 202 are set to be N. Namely, with respect to the simultaneous linear equations the coefficient matrix of which is the dense matrix, too, the embodiment of the present invention allows the solutions to be calculated in much the same way as in the prior art.

Also, if, at the step 401, ISW is equal to "1" and it is judged to calculate the structure of the non-zero elements, the steps 403 to 415 explained hereinafter are executed. Namely, at first, at the step 403, all the values in the indexes IMTB 201 and JMTB 202 are initialized to be "0".

Next, at the step 404, the index IMTB 201 is calculated. At the step 404, on the inner side of a processing (step 405) in which, while incrementing J from 1 up to N on a one-by-one basis, the iteration is performed, there exists a processing (step 406) in which, while decrementing I from N down to 1 on a one-by-one basis, the iteration is performed. On the even inner side, it is judged whether or not an element A(I, J) of the coefficient matrix designated by the row number I and the column number J is equal to "0" (step 407). If the element A is not equal to "0", I is set into IMTB (J), then terminating the iteration processing at the step 406 (step 408).

At the step 409, the index JMTB 202 is calculated. At the step 409, on the inner side of a processing (step 410) in which, while incrementing I from 1 up to N on a one-by-one basis, the iteration is performed, there exists a processing (step 411) in which, while decrementing J from N down to 1 on a one-by-one basis, the iteration is performed. On the even inner side, it is judged whether or not the element A(I, J) of the coefficient matrix designated by the row number I and the column number J is equal to "0" (step 412). If the element A is not equal to "0", J is set into JMTB (I), then terminating the iteration processing at the step 411 (step 413).

Next, at the step 414, it is judged whether or not a number the value of which is equal to "0" exists within the index IMTB or JMTB. If "0" exists, a row or a column including only zero elements turns out to exist. From this condition, the given coefficient matrix is judged to be a singular matrix, then terminating the processing (step 416).

If "0" does not exist within the indexes IMTB and JMTB, the values in the indexes IMTB 201 and JMTB 202 are set so that the following relations will hold (step 415): IMTB (J)≧IMTB (J−1), JMTB (I)≧JMTB (I−1) (I, J=2, . . . , N) These relations are given in order that the modifications in the indexes will be minimized even toward the variation in the non-zero structure caused by the pivoting. In this way, the elements existing outside the range indicated by the index table 107 in the coefficient matrix can be omitted as out-of-processing targets.

Incidentally, in the case where the processings at the steps 403 to 415 are executed with the coefficient matrix of the dense matrix whose elements are all non-zero elements, all the values in the indexes IMTB 201 and JMTB 202 are set to be N.

Figure 5:
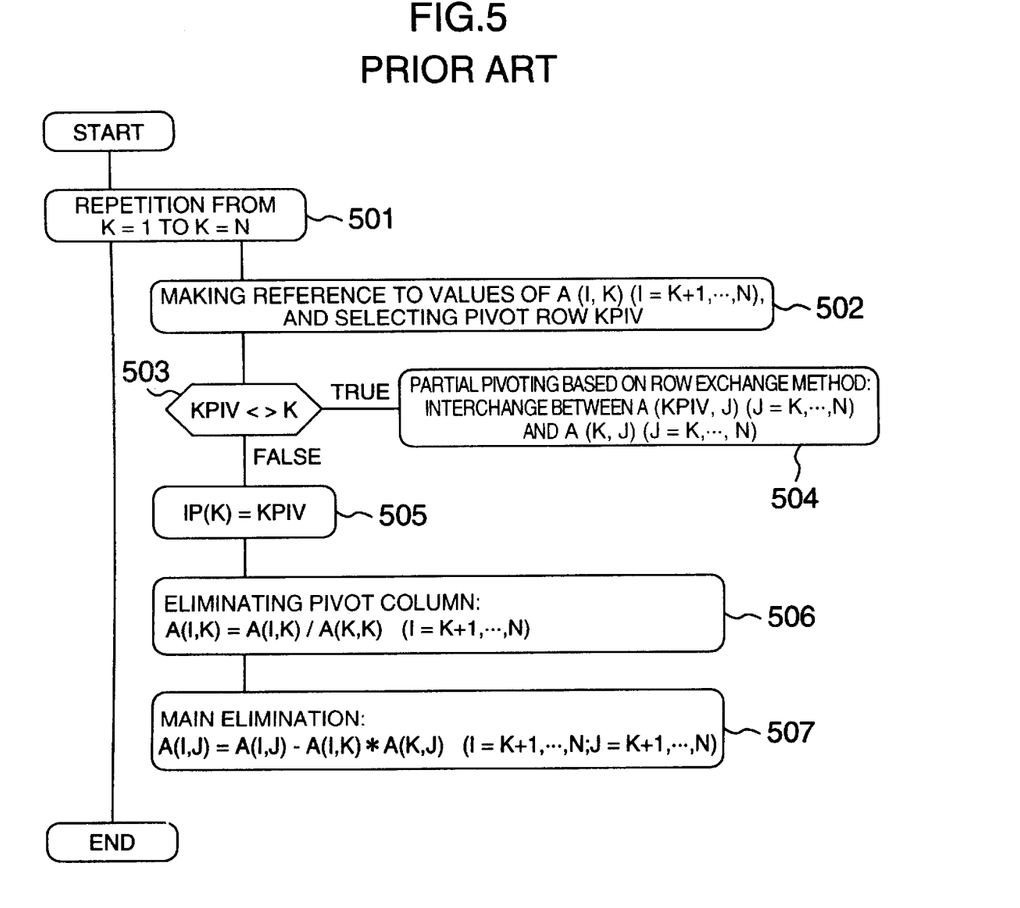
FIG. 5 is a flow chart for illustrating the processing steps of the decomposition processing in the prior art.

FIG. 5 is a flow chart for illustrating the processing steps of the decomposition processing in the prior art. FIG. 5 illustrates the processing steps of the decomposition processing where the Gauss method with respect to the dense matrix is executed without using the non-zero-structure-specifying index table 107.

In this decomposition processing, processings at steps 502 to 507 are repeated, while incrementing K from 1 up to N on a one-by-one basis at a step 501.

At the step 502, after making reference to the values of a pivot column A (I, K) (I=K+1, . . . , N), the value of I of an element whose absolute value is the largest is substituted into a variable KPIV. Next, a comparison is made between the value of KPIV and that of K (step 503). If the values are not equal to each other, A (KPIV, J) (J=K, ..., N) in the KPIV-th row and A (K, J) (J=K, ..., N) in the K-th row are exchanged with each other (step 504). At the step 505, the values of the pivot row KPIV selected in the K-th stage are stored into an array IP (K), thereby being held. This information will be utilized in the forward/backward substitution processing.

Next, at the step 506, the pivot column A (I, K) (I=K+1, ..., N) is eliminated with a pivot element A (K, K). Namely, as shown by a mathematical expression illustrated at the step 506 in FIG. 5, A (I, K)/A (K, K) is substituted into A (I, K), thereby updating the values of A (I, K). In this way, in the present embodiment, the term "eliminate" is assumed to represent "update". At the step 507, as shown by a mathematical expression illustrated at the step 507 in FIG. 5, A (I, J) is eliminated from the pivot column A (I, K) (I=K+1, ..., N) and a pivot row A (K, J) (J=K+1, ..., N) (step 507).

Figure 6:
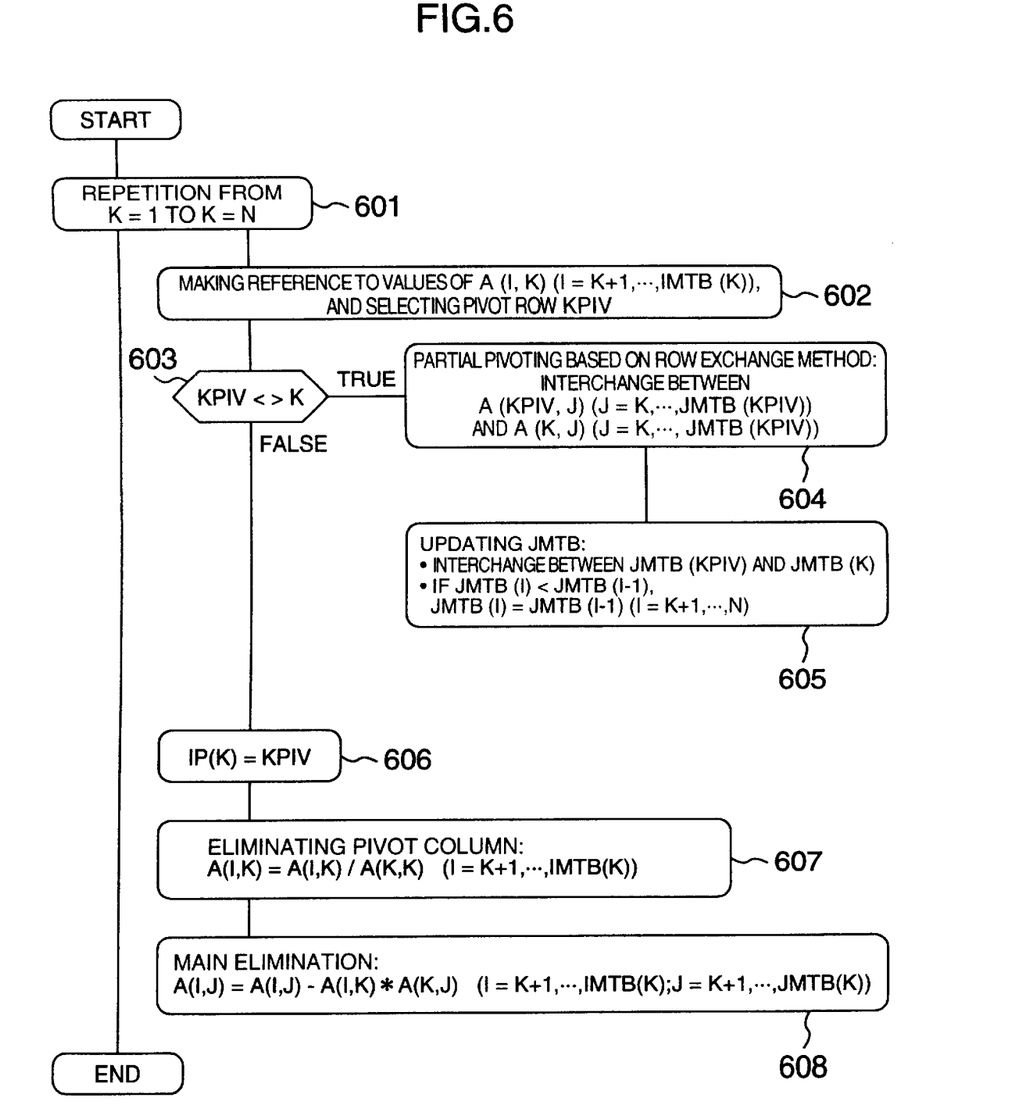
FIG. 6 is a flow chart for illustrating the processing steps of the decomposition processing in the present embodiment.

FIG. 6 is a flow chart for illustrating the processing steps of the decomposition processing in the present embodiment. Unlike the processings in FIG. 5, FIG. 6 illustrates the processing steps of the decomposition processing where, using the non-zero-structure-specifying index table 107, the Gauss method is applied to the matrix elements of the sparse matrix as is the case with the dense matrix.

In the decomposition processing section 112 in the present embodiment, processings at steps 602 to 608 are repeated, while incrementing K from 1 up to N on a one-by-one basis at a step 601.

At the step 602, after making reference to the values of a pivot column A (I, K) (I=K+1, ..., IMTB(K)), the value of I of an element whose absolute value is the largest is substituted into the variable KPIV. In this processing at the step 602, in comparison with the step 502, the selection range has been decreased from N down to IMTB(K).

Next, a comparison is made between the value of KPIV and that of K (step 603). If the values are not equal to each other, A (KPIV, J) (J=K, ..., JMTB(KPIV)) in the KPIV-th row and A (K, J) (J=K, ..., JMTB(KPIV)) in the K-th row are exchanged with each other (step 604). In this processing at the step 604, in comparison with the step 504, the selection range has been decreased from N down to JMTB (KPIV).

At the step 605, the values in the index JMTB are updated in accompaniment with the pivoting. Also, the values in JMTB(I) (I=K+1, ..., N) are set so that the relation JMTB (I)≧JMTB (I−1) (I=2, ..., N) is satisfied. In the present embodiment, here, the values in the index IMTB have been set so that the relation IMTB (J)≧IMTB (J−1) (J=2, ..., N) is satisfied. This condition makes it unnecessary to update the values in the index IMTB toward the variation in the non-zero structure caused by the pivoting, thereby making it possible to decrease the number of the arithmetic operations needed for modifying the index.

At the step 606, the values of the pivot row KPIV selected in the K-th stage are stored into the array IP (K), thereby being held. This information will be utilized in the forward/backward substitution processing section 113.

Next, at the step 607, as shown by a mathematical expression illustrated at the step 607 in FIG. 6, the pivot column A (I, K) (I=K+1, ..., IMTB(K)) is eliminated with the pivot element A (K, K). In this processing as well, in comparison with the step 506, the elimination range has been decreased from N down to IMTB(K). At the step 608, as shown by a mathematical expression illustrated at the step 608 in FIG. 6, A (I, J) is eliminated from the pivot column A (I, K) (I=K+1, ..., IMTB(K)) and a pivot row A (K, J) (J=K+1, ..., JMTB(K)). In this processing as well, in comparison with the step 507, the elimination range has been decreased from N down to IMTB(K), JMTB(K).

Figure 7:
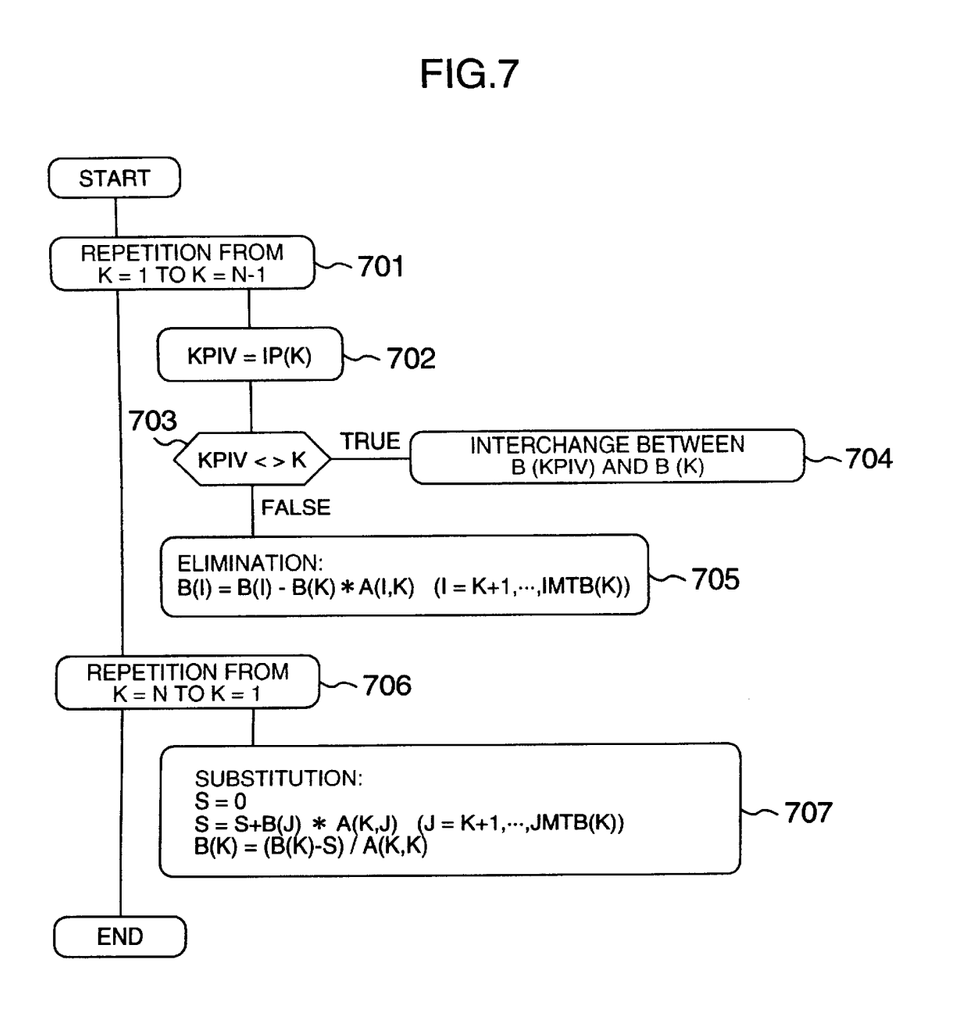
FIG. 7 is a flow chart for illustrating the processing steps of the forward/backward substitution processing in the present embodiment.

FIG. 7 is a flow chart for illustrating the processing steps of the forward/backward substitution processing in the present embodiment. FIG. 7 illustrates the processing steps of the forward/backward substitution processing that uses the non-zero-structure-specifying index table 107.

In the forward/backward substitution processing section 113 in the present embodiment, processings at steps 702 to 705 are repeated, while incrementing K from 1 up to N−1 on a one-by-one basis at a step 701.

At the step 702, the values of the pivot row KPIV selected in the K-th stage and set at the step 606 are extracted from the array IP (K), then being substituted into the variable KPIV.

Next, a comparison is made between the value of the above-described extracted KPIV and that of K (step 703). If the values are not equal to each other, B (KPIV) and B (K) are exchanged with each other (step 704). Here, B is the array into which the values of the right-side vector have been stored.

At the step 705, as shown by a mathematical expression illustrated at the step 705 in FIG. 7, B (I) (I=K+1, ..., IMTB(K)) is eliminated from B (K) and A (I, K) (I=K+1, ..., IMTB(K)). In this processing, the use of the index IMTB has decreased the elimination range from N down to IMTB (K).

At a step 706, a processing at a step 707 is repeated, while decrementing K from N down to 1 on a one-by-one basis. At the step 707, as shown by mathematical expressions illustrated at the step 707 in FIG. 7, the solutions of the simultaneous linear equations are calculated from B (J), A (K, J) (J=K+1, ..., JMTB(K)), and A (K, K), then being stored into B (K). Here, the iteration processing at the step 707 of repeating (J=K+1, ..., JMTB(K)) is a processing of incrementing J from K+1 up to JMTB(K) on a one-by-one basis. Incidentally, if K is equal to N, J becomes larger than JMTB(K). Accordingly, directly employing S=0 as it is without executing this iteration processing, the forward/backward substitution processing section 113 executes the calculation of B (N), then substituting B (N)/A (N, N) into B (N). In this processing, the use of the index JMTB has decreased the calculation range from N down to JMTB(K).

As having been described earlier, according to the present embodiment, the waste of storing the zero elements is tolerated, and the same data storing methods as those for the dense matrix are employed for whatever coefficient matrix in a manner of being independent of the structure of the non-zero elements of the coefficient matrix. This makes it possible to present whatever coefficient matrix as the dense matrix without necessitating the empirical and professional knowledge and without being conscious of the structure of the non-zero elements of the coefficient matrix. This, further, eliminates the conventional task of selecting a simultaneous-linear-equations solving program dedicated specifically for each structure of the non-zero elements of each coefficient matrix, thereby making it possible to implement an enhancement in the operability. Also, in the present embodiment, the calculations are executed concerning only the elements existing within the range indicated by the above-described created non-zero-structure-specifying index table. This allows the simultaneous linear equations to be solved in such a manner that the calculation amount therefor has been reduced.

What is claimed is:

1. A method of calculating numerical solutions of simultaneous linear equations by a simultaneous-linear-equations solving apparatus, said simultaneous linear equations having coefficient matrix elements and right-side vector elements, comprising the steps of:

inputting, from an input apparatus, values of said coefficient matrix elements and values of said right-side vector elements of said simultaneous linear equations to be solved, storing said inputted values of said coefficient matrix elements and those of said right-side vector elements into a memory apparatus, a memory region for storing said inputted values of said coefficient matrix elements in said memory apparatus having a memory capacity capable of storing all of said coefficient matrix elements, creating a non-zero-structure-specifying index table for indicating a row number of a terminal-end non-zero element in each column and a column number of a terminal-end non-zero element in each row within said coefficient matrix, executing a decomposition processing toward said elements existing within a range indicated by said created index table, executing, based on said index table, a forward/backward substitution processing toward said coefficient matrix elements and said stored right-side vector elements, and thereby determining said numerical solutions, said coefficient matrix elements having been subjected to said decomposition processing, and outputting said determined numerical solutions from an output apparatus.

2. The method as claimed in claim 1, further comprising the steps of setting said row number of said terminal-end non-zero element in said each column to be equal to a row number of a terminal-end non-zero element in a preceding column if said row number of said terminal-end non-zero element in said each column is smaller than said row number of said terminal-end non-zero element in said preceding column, and setting said column number of said terminal-end non-zero element in said each row to be equal to a column number of a terminal-end non-zero element in a preceding row if said column number of said terminal-end non-zero element in said each row is smaller than said column number of said terminal-end non-zero element in said preceding row.

3. The method as claimed in claim 1, further comprising the steps of inputting an instruction for indicating whether or not to set said row number and said column number of said terminal-end non-zero element into said index table, and setting a largest row number and a largest column number within said coefficient matrix into said index table if said instruction of not executing said setting is inputted.

4. The method as claimed in claim 2, further comprising the steps of inputting an instruction for indicating whether or not to set said row number and said column number of said terminal-end non-zero element into said index table, and setting a largest row number and a largest column number within said coefficient matrix into said index table if said instruction of not executing said setting is inputted.

5. A simultaneous-linear-equations solving apparatus for calculating numerical solutions of simultaneous linear equations having coefficient matrix elements and right-side vector elements, comprising:

an input apparatus for inputting values of said coefficient matrix elements and values of said right-side vector elements of said simultaneous linear equations to be solved, a memory apparatus for storing said inputted values of said coefficient matrix elements and those of said right-side vector elements, a memory region for storing said inputted values of said coefficient matrix elements in said memory apparatus having a memory capacity capable of storing all of said coefficient matrix elements, a non-zero-structure-specifying index table for indicating a row number of a terminal-end non-zero element in each column and a column number of a terminal-end non-zero element in each row within said coefficient matrix, a decomposition processing section for executing a decomposition processing toward said elements existing within a range indicated by said created index table, a forward/backward substitution processing section for executing, based on said index table, a forward/backward substitution processing toward said coefficient matrix elements and said stored right-side vector elements, and thereby determining said numerical solutions, said coefficient matrix elements having been subjected to said decomposition processing, and an output apparatus for outputting said determined numerical solutions.

6. A simultaneous-linear-equations solving method of calculating numerical solutions of simultaneous linear equations whose coefficient matrix is a sparse matrix, comprising the steps of:

storing, as an array, all elements of coefficient matrix elements of said sparse matrix including zero elements and all elements of right-side vector elements, creating a non-zero-structure-specifying index table for indicating a row number of a terminal-end non-zero element in each column and a column number of a terminal-end non-zero element in each row within said array, executing a decomposition processing toward said elements existing within a range indicated by said created index table, and executing, based on said index table, a forward/backward substitution processing toward said coefficient matrix elements subjected to said decomposition processing and said right-side vector elements stored as said array.

7. The simultaneous-linear-equations solving method as claimed in claim 6, further comprising the steps of setting said row number of said terminal-end non-zero element in said each column to be equal to a row number of a terminal-end non-zero element in a preceding column if said row number of said terminal-end non-zero element in said each column is smaller than said row number of said terminal-end non-zero element in said preceding column, and setting said column number of said terminal-end non-zero element in said each row to be equal to a column number of a terminal-end non-zero element in a preceding row if said column number of said terminal-end non-zero element in said each row is smaller than said column number of said terminal-end non-zero element in said preceding row.

8. The simultaneous-linear-equations solving method as claimed in claim 7, further comprising the steps of inputting an instruction for indicating whether or not to set said row number and said column number of said terminal-end non-zero element into said index table, and setting a largest row number and a largest column number within said coefficient matrix into said index table if said instruction of not executing said setting is inputted.

9. The simultaneous-linear-equations solving method as claimed in claim 6, further comprising the steps of inputting an instruction for indicating whether or not to set said row number and said column number of said terminal-end non-zero element into said index table, and setting a largest row number and a largest column number within said coefficient matrix into said index table if said instruction of not executing said setting is inputted.

10. A simultaneous-linear-equations solving apparatus for calculating numerical solutions of simultaneous linear equations whose coefficient matrix is a sparse matrix, comprising:

a coefficient matrix input processing section for storing, as an array, all elements of coefficient matrix elements of said sparse matrix including zero elements and all elements of right-side vector elements, a non-zero-elements structure calculation processing section for creating a non-zero-structure-specifying index table for indicating a row number of a terminal-end non-zero element in each column and a column number of a terminal-end non-zero element in each row within said array, a decomposition processing section for executing a decomposition processing toward said elements existing within a range indicated by said created index table, and a forward/backward substitution processing section for executing, based on said index table, a forward/backward substitution processing toward said coefficient matrix elements subjected to said decomposition processing and said right-side vector elements stored as said array.

11. A computer-readable recording medium that records a program for causing a computer to function as a simultaneous-linear-equations solving apparatus for calculating numerical solutions of simultaneous linear equations whose coefficient matrix is a sparse matrix, said recording medium recording said program for causing said computer to function as:

a coefficient matrix input processing section for storing, as an array, all elements of coefficient matrix elements of said sparse matrix including zero elements and all elements of right-side vector elements, a non-zero-elements structure calculation processing section for creating a non-zero-structure-specifying index table for indicating a row number of a terminal-end non-zero element in each column and a column number of a terminal-end non-zero element in each row within said array, a decomposition processing section for executing a decomposition processing toward said elements existing within a range indicated by said created index table, and a forward/backward substitution processing section for executing, based on said index table, a forward/backward substitution processing toward said coefficient matrix elements subjected to said decomposition processing and said right-side vector elements stored as said array.

12. A program for calculating numerical solutions of simultaneous linear equations having coefficient matrix elements and right-side vector elements, said program being storable in a computer-readable memory medium, comprising:

an input processing section for inputting, from an input apparatus, values of said coefficient matrix elements and values of said right-side vector elements of said simultaneous linear equations to be solved, and storing said inputted values of said coefficient matrix elements and those of said right-side vector elements into a memory apparatus, a memory region for storing said inputted values of said coefficient matrix elements in said memory apparatus having a memory capacity capable of storing all of said coefficient matrix elements, a processing section for creating a non-zero-structure-specifying index table for indicating a row number of a terminal-end non-zero element in each column and a column number of a terminal-end non-zero element in each row within said coefficient matrix, a decomposition processing section for executing a decomposition processing toward said elements existing within a range indicated by said created index table, a forward/backward substitution processing section for executing, based on said index table, a forward/backward substitution processing toward said coefficient matrix elements and said stored right-side vector elements, and thereby determining said numerical solutions, said coefficient matrix elements having been subjected to said decomposition processing, and a processing section for outputting said determined numerical solutions from an output apparatus.

* * * * *

UNITED STATES PATENT AND TRADEMARK OFFICE
CERTIFICATE OF CORRECTION

PATENT NO. : 6,826,585 B2
DATED : November 30, 2004
INVENTOR(S) : Saori Mitsunaga et al.

It is certified that error appears in the above-identified patent and that said Letters Patent is hereby corrected as shown below:

<u>Title page,</u>
Item [73], Assignees, should read:
-- Hitachi, Ltd., Tokyo (JP)
   Hitachi Software Engineering Co., Ltd., Yokohama (JP) --.

Signed and Sealed this

Eighteenth Day of October, 2005

JON W. DUDAS
*Director of the United States Patent and Trademark Office*